United States Patent Office 3,376,488
Patented Apr. 2, 1968

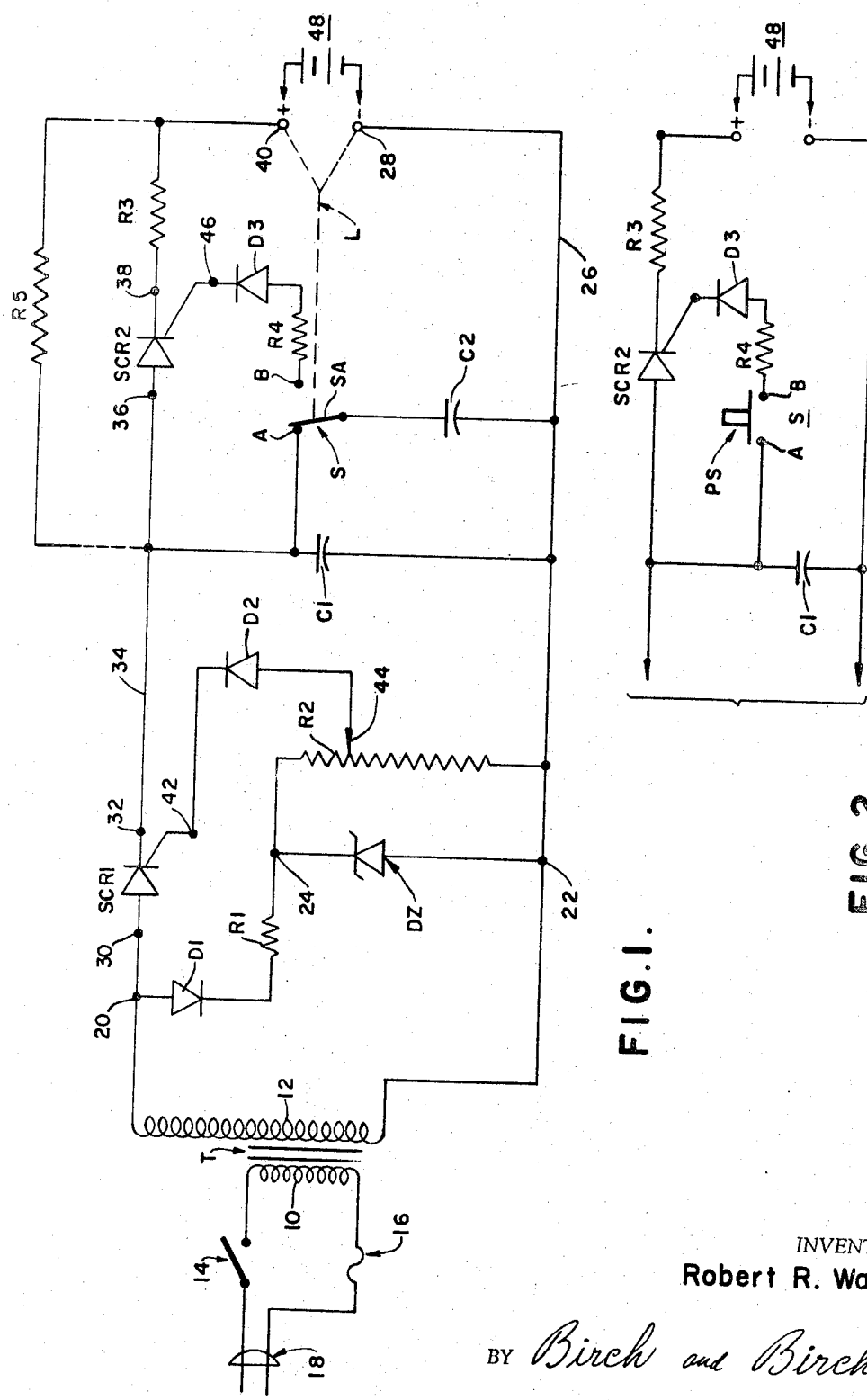

3,376,488
SINGLE-CYCLE SELF-REGULATING
BATTERY CHARGER
Robert R. Walsh, Wilmington, Del., assignor to All American Engineering Company, Wilmington, Del., a corporation of Delaware
Continuation-in-part of application Ser. No. 362,358, Apr. 24, 1964. This application Dec. 15, 1966, Ser. No. 602,035
14 Claims. (Cl. 320—40)

ABSTRACT OF THE DISCLOSURE

A battery charger is provided in which single charging cycles are either initiated by manual switching or by manual insertion of a battery between the load terminals of the charging circuit. Two solid-state controlled rectifiers are utilized, one to maintain a load capacitance charged to a reference potential and the other to either preclude a charging cycle or permit same to occur upon the manual switching of the charger circuit, by comparing the relative magnitudes of the voltage on the load capacitor and the terminal voltage of the battery to be charged.

---

This application is a continuation-in-part of my co-pending application Ser. No. 362,358, filed Apr. 24, 1964, now Patent No. 3,305,755.

This invention relates to battery chargers which monitor the terminal voltage of the battery or other load to which they supply energy and more particularly to such chargers wherein the characteristic of the battery or load is such that charging must be either manually initiated or automatically initiated by the physical insertion of a battery into the charger and the charging of the battery then commences until a predetermined rated terminal voltage of the battery is reached, at which point the charging cycle is automatically terminated.

It is an object of this invention to provide an inexpensive and highly sensitive battery charger including automatic battery terminal voltage monitoring means which automatically initiates charging of a battery upon insertion of the battery into the charger circuit and automatically terminates charging of said battery when the terminal voltage thereof reaches a preselected rated value.

Another object of this invention is to provide an inexpensive and highly sensitive single-cycle battery charger including automatic battery terminal voltage monitoring means which automatically terminates charging of a battery when said terminal voltage achieves a predetermined rated value and which initiates charging of said battery by manually controlled means, and wherein said charger will only charge said battery if the terminal voltage of the latter is initially less than rated terminal voltage.

These and other objects of this invention will become more fully apparent with reference to the following specification and drawings which relate to several preferred embodiments of the invention.

In the drawings:

FIGURE 1 comprises a schematic diagram of a first embodiment of a battery charger under the present invention which automatically initiates a charging cycle of a battery when the battery is placed in the charger; and FIGURE 2 is a partial schematic diagram of another embodiment of the present invention effecting a manually initiated, automatically terminated, single-cycle charge of a battery.

Referring in detail to the drawings, the battery charger of the invention is shown as including an input transformer T having a primary winding 10 and a secondary winding 12, the primary 10 being connected in series with an on-off switch 14 and a fuse 16 and adapted to be connected across any suitable alternating current supply by means of a power plug 18.

The secondary 12, of the transformer T, includes first and second output terminals 20 and 22, respectively, across which is connected, in series, a rectifier diode $D_1$, a dropping resistor $R_1$ and a Zener diode $D_Z$, the cathode terminal of the said Zener diode and the resistor $R_1$ being connected at a common node 24.

The second output terminal 22 of the secondary 12 is connected through a common lead 26 directly to the negative output terminal 28 of the battery charger.

A voltage standard is provided by means of a voltage divider comprising a second dropping resistor $R_2$, connected across the Zener diode $D_Z$ from the node 24, between the first dropping resistor $R_1$ and Zener diode $D_Z$, to the common lead 26.

The first output terminal 20 of the secondary 12 is connected, via a series circuit comprising anode terminal 30 and cathode terminal 32 of a first silicon controlled rectifier SCR1 (hereinafter referred to merely as the SCR1), lead 34, anode terminal 36 and cathode terminal 38 of a second silicon controlled rectifier SCR2 (hereinafter referred to merely as the SCR2), and current limiting resistor $R_3$ with the positive output terminal 40 of the battery charger.

The SCR1 includes a gate terminal 42 which is connected through a first isolating diode $D_2$ and variable tap 44 to an intermediate point on the second dropping resistor $R_2$.

The SCR2 includes a gate terminal 46 which is connected through a second isolating diode $D_3$ and fourth resistor $R_4$ to a first switch terminal B, comprising the "ON" terminal of a charger control switch S. The control switch S includes a second terminal A comprising the "OFF" terminal thereof connected to the cathode terminal 32 of the SCR1, at the lead 34 and a double throw switch arm SA.

A capacitor load $C_1$ for the SCR1 is connected from the cathode 32 of the SCR1, at the lead 34, to the common negative lead 26. A second capacitor $C_2$ is connected from the switch arm SA to the common negative lead 26.

A fifth resistor $R_5$ may be connected in shunt with the SCR2 to effect a trickle charge.

The control switch S may take several forms, one of which may be a manually operated single-pole double-throw switch as conventionally shown in solid line configuration in FIGURE 1.

A second embodiment of the control switch S is shown to include an actuating link means L extending from a position immediately proximate the battery charger output terminals 28 and 40 to the swich arm SA. The link L is adapted to be engaged by a battery 48 when the said battery is placed into electrical contact with the output terminals 28 and 40 in order to receive a charge. The switch arm SA and/or the link L may be biased by any suitable means to normally hold the switch arm SA in engagement with the OFF terminal A in the absence of a battery 48 between the output terminals 28 and 40.

Referring now to FIGURE 2, the switch arm SA is replaced by a push-button contactor PS adapted to bridge the switch terminals A and B when actuated. Accordingly, the contactor PS is shown in a normally open configuration.

In the embodiment of FIGURE 2, the second capacitor $C_2$ is omitted, for a purpose hereinafter to be more fully described.

Operation

Assuming that A.C. power is applied to the plug 18 and switch 14 is closed and that, therefore, the transformer T is energized, the voltage across the secondary output terminals 20 and 22 is rectified by the first diode $D_1$, delivering direct current power to the node 24 via the first dropping resistor $R_1$.

The relative values of the first resistor $R_1$ and the value of the second resistor $R_2$, is such that the Zener diode $D_Z$ will break down and conduct in the reverse direction in response to the initial voltage appearing at the node 24, whereby, thereafter a regulated standard voltage appears across the voltage divider comprised of the said second, and variable tap 44.

By selectively adjusting the position of the variable tap 44 on the second resistor $R_2$, the gating voltage applied from said variable tap 44 to the gate terminal 42 of the SCR1 is constrained to the proper value with respect to the particular conditions of operation.

The gating voltage from the variable tap 44 causes the SCR1 to conduct and charge the load capacitor $C_1$ to the voltage equal to that at the said variable tap 44. The SCR1 then cuts off on the next half-cycle of A.C. power from the secondary terminals 20 and 22.

The ultimate charged potential of the load capacitor $C_1$ is controlled in this manner since it is a characteristic of silicon controlled switching devices that they will not conduct except when a small control current determined by a forward bias or gating potential is flowing in a forward direction into the gating terminal thereof, the silicon controlled switching means SCR will be biased to cut off and effectively appear to be an open circuited switch when the potential difference between the gating voltage at the gate terminal 42 and the voltage at the cathode terminal 32, the latter in this case being the terminal voltage of the load capacitor $C_1$, drops below a predetermined minimum for the particular type silicon controlled switching device used. For example, a silicon controlled switch such as a G.E. type C5U or a silicon controlled rectifier such as a G.E. type C15U may be used as the silicon controlled switch means SCR1 in the present invention.

The load capacitor $C_1$ supplies D.C. power to the anode terminal 36 of the SCR2.

Assuming the presence of the actuating link means L in the embodiment of FIGURE 1, a charged condition of the first and second capacitors $C_1$ and $C_2$, and the absence of a battery 48 at the charger terminals 28 and 40, the operation of the embodiment of FIGURE 1 is as follows.

Insertion of a battery 48 into the charger circuit at the terminals 28 and 40 actuates the switch arm SA through the link means L to engage the ON terminal B of the control switch S. This causes the second capacitor $C_2$ to discharge through the fourth resistor into the gate terminal 46 of the SCR2, turning the SCR2 on and supplying charging current to the battery 48 through the third current limiting resistor $R_3$.

If the battery is fully charged, no potential difference will exist between the ON terminal B and the positive charger terminal 40 and the SCR2 will not be constrained to conduct. However, if the battery terminal voltage is less than that preselected by the variable tap 44 and thus that voltage on the second capacitor $C_2$ effected by the SCR1, then a gate current will flow and the battery 48 will be charged until such time as the battery terminal voltage equals the preselected voltage at the tap 44 and on the load capacitor $C_1$. At this point, the SCR2 will cease to conduct, there being no potential difference between the anode terminal 36 and cathode terminal 38 of the SCR2 and therefore, no flow of holding current therebetween.

Similarly, once the SCR2 has ceased to conduct, the SCR1 will be rendered non-conductive, since the load capacitor $C_1$ can no longer discharge through the SCR2 and will be maintained at its fully charged preselected voltage as determined by the position of the variable tap 44 on the second resistor $R_2$.

If the battery 48 is now removed from the charger terminals 28 and 40, the link means L will permit the switch arm SA to return to its normal position at the OFF terminal A of the control switch S. The SCR1 will then be rendered conductive as previously described until both the load capacitor $C_1$ and second capacitor $C_2$ are fully charged and in readiness for the next charging cycle. In practice, a substantially momentary conductive state of the SCR1 is all that is required to fully charge the capacitors $C_1$ and $C_2$ when the switch arm SA is at the OFF terminal A.

In the alternate embodiment of FIGURE 1, the switch arm SA of the charger control switch S is manually operated to engage the ON terminal B either momentarily or until such time as a battery 48 placed between the charger terminals 28 and 40 is removed. In either case, the second capacitor $C_2$ is discharged through the gate terminal 46 of the SCR2 to initiate a charge cycle and the operation is otherwise identical to that previously described.

In the embodiment of FIGURE 2, momentary actuation of the push-button PS bridges the terminals A and B of the control switch S and causes the load capacitor $C_1$ to begin to discharge through the fourth resistor $R_4$, second isolating diode $D_3$ and gate terminal 46 of the SCR2 to effect conduction in the SCR2. This, of course, is assuming the presence of a battery 48 connected at the charger terminals 28 and 40.

The capacitor $C_1$ is then discharging through the anode-cathode path 36–38 of the SCR2 and when the push-button PS is released will continue to do so, maintaining the SCR2 conductive, until the terminal voltage of the battery 48 is raised to that on the load capacitor $C_1$ as determined by the setting of the variable tap 44.

The operation is otherwise identical with that described herein for the embodiments of FIGURE 1.

It will be apparent that methods known in the art can be applied for compensating the various components of this circuit against thermal drift of characteristics resulting from changes in ambient temperature should such additional stability be required.

As can be seen from the foregoing specification and drawings, this invention provides a battery charger which is inexpensive, compact and highly sensitive and which automatically monitors the terminal voltage of a battery being charged thereby and automatically terminates the charge cycle upon the advent of a predetermined terminal voltage, at the said battery. Further, the initiation of a charging cycle may either be automatically responsive to the insertion of a battery load into the charging circuit or may be manually controlled.

It is to be undesrtood, that the embodiments of the invention shown and described herein are for the purpose of example only and are not intended to limit the scope of the appended claims.

What is claimed is:

1. Charging means for delivering charging current to a load, said load having a predetermined maximum terminal voltage, said charging means comprising a power source, circuit means connected with said power source deriving a voltage standard therefrom equal to said predetermined maximum terminal voltage, first and second semiconductor switch means connected in series with said power source and said load, said first and second switch means including first and second gate terminals, respectively, conductor means applying said voltage standard to said first gate terminal, capacitance load means connected in series with said first semiconductor switch means and in parallel with said load to be charged to said maximum terminal voltage by said first semiconductor switch means, and control means selectively discharging said capacitance load means into said second gate terminal to initiate conduction in said second semiconductor switch means when the terminal voltage of said load is below said predetermined maximum.

2. The invention defined in claim 1, wherein said conductor means includes a diode connected in forward direction from said circuit means to said first gate terminal.

3. The invention defined in claim 1, wherein said semiconductor switch means each comprise a silicon controlled rectifier means, said rectifier means having anode and cathode terminals in series with said power source and said load, and wherein said charging means further includes a current limiting resistance means connected in series between said load and said second rectifier means.

4. The invention defined in claim 1, wherein said circuit means comprises rectifier means, first resistance means and voltage divider means connected in series across said power source, said voltage divider means including second resistance means and a variable tap thereon, and voltage regulator means connected across said voltage divider means maintaining said predetermined maximum voltage at said variable tap, said variable tap being connected through said conductor means to said first gate terminal.

5. The invention defined in claim 4, wherein said conductor means comprises diode means connected in forward direction from said variable tap to said first gate terminal.

6. The invention defined in claim 1, wherein said semiconductor switch means each comprises a silicon controlled rectifier means, said controlled rectifier means having anode and cathode terminals in series with said power source and said load, and wherein said charging means further includes a current limiting resistance means connected in series between said power source and said second rectifier means; and wherein said circuit means comprises rectifier means, first resistance means and voltage divider means connected in series across said power source, said voltage divider means including second resistance means and a variable tap thereon, and voltage regulator means connected across said voltage divider means maintaining said predetermined maximum voltage at said variable tap, said variable tap being connected through said conductor means to said first gate terminal.

7. The invention defined in claim 1, wherein said charging means further includes charging terminals adapted to receive a battery load; and wherein said control means comprises switch means adapted to be actuated by the insertion of a battery load into engagement with said charging terminals effecting an interconnection of said load capacitance means with and a discharge of said load capacitance means into said second gate terminal, rendering said second semiconductor switch means conductive and initiating a charging cycle.

8. The invention defined in claim 1, wherein said control means comprises switch means adapted to be actuated by the insertion of a battery load into engagemnt with said charging terminals effecting an interconnection of said load capacitance means with and a discharge of said load capacitance means into said second gate terminal, rendering said second semiconductor switch means conductive and initiating a charging cycle.

9. The invention defined in claim 8, wherein said load capacitance means comprises first and second capacitors; and wherein said switch means has first and second positions of actuation; said switch means in said first position connecting said first and second capacitors in parallel and in said second position connecting said second capacitor with said second gate terminal of said second semiconductor switch means.

10. The invention defined in claim 8, wherein said switch means comprises a normally open, momentarily actuated switch effecting a momentary connection of said capacitance load means with said second gate terminal of said second semiconductor switch means.

11. The invention defined in claim 7, wherein said semiconductor switch means each comprise a silicon controlled rectifier means, said rectifier means having anode and cathode terminals in series with said power source and said load, and wherein said charging means further includes a current limiting resistance means connected in series between said load and said second rectifier means.

12. The invention defined in claim 8, wherein said semiconductor switch means each comprise a silicon controlled rectifier means, said rectifier means having anode and cathode terminals in series with said power source and said load, and wherein said charging means further includes a current limiting resistance means connected in series between said load and said second rectifier means.

13. The invention defined in claim 9, wherein said semiconductor switch means each comprise a silicon controlled rectifier means, said rectifier means having anode and cathode terminals in series with said power source and said load, and wherein said charging means further includes a current limiting resistance means connected in series between said load and said second rectifier means.

14. The invention defined in claim 10, wherein said semiconductor switch means each comprise a silicon controlled rectifier means, said rectifier means having anode and cathode terminals in series with said power source and said load, and wherein said charging means further includes a current limiting resistance means connected in series between said load and said second rectifier means.

References Cited

UNITED STATES PATENTS

| 3,147,419 | 9/1964 | Cope | 318—129 |
| 3,160,805 | 12/1964 | Lawson | 320—39 |
| 3,211,964 | 10/1965 | Thorne | 317—151 |
| 3,273,038 | 9/1966 | Miller | 320—2 |
| 3,299,297 | 1/1967 | Motto | 307—88.5 |
| 3,305,755 | 2/1967 | Wash | 320—40 |

FOREIGN PATENTS 830,074  3/1960  Great Britain.

JOHN F. COUCH, *Primary Examiner.*

S. WEINBERG, *Assistant Examiner.*